(12) United States Patent
Foreman et al.

(10) Patent No.: US 11,527,167 B2
(45) Date of Patent: Dec. 13, 2022

(54) SYSTEM, APPARATUS AND METHOD FOR INTERACTIVE READING

(71) Applicant: THE MARKETING STORE WORLDWIDE, LP, Chicago, IL (US)

(72) Inventors: Thomas Foreman, London (GB); Hiren Jakison, London (GB)

(73) Assignee: The Marketing Store Worldwide, LP, Chicago, IL (US)

( * ) Notice: Subject to any disclaimer, the term of this patent is extended or adjusted under 35 U.S.C. 154(b) by 493 days.

(21) Appl. No.: 16/317,252

(22) PCT Filed: Jul. 13, 2017

(86) PCT No.: PCT/US2017/041836
§ 371 (c)(1),
(2) Date: Jan. 11, 2019

(87) PCT Pub. No.: WO2018/013752
PCT Pub. Date: Jan. 18, 2018

(65) Prior Publication Data
US 2019/0251854 A1    Aug. 15, 2019

Related U.S. Application Data

(60) Provisional application No. 62/361,644, filed on Jul. 13, 2016.

(51) Int. Cl.
| | | |
|---|---|---|
| *G09B 17/00* | (2006.01) |
| *G06Q 10/10* | (2012.01) |
| *G10K 15/04* | (2006.01) |
| *H04N 21/8545* | (2011.01) |
| *G09B 5/06* | (2006.01) |
| *G06F 3/16* | (2006.01) |
| *H04N 21/81* | (2011.01) |

(52) U.S. Cl.
CPC ............. *G09B 5/062* (2013.01); *G06F 3/167* (2013.01); *G06Q 10/10* (2013.01); *G10K 15/04* (2013.01); *H04N 21/816* (2013.01); *H04N 21/8545* (2013.01); *G09B 17/00* (2013.01)

(58) Field of Classification Search
CPC ......... G09B 5/062; G09B 17/00; G06F 3/167; G06Q 10/10; G10K 15/04; H04N 21/816; H04N 21/8545
See application file for complete search history.

(56) References Cited

U.S. PATENT DOCUMENTS

| | | | |
|---|---|---|---|
| 2002/0087555 A1* | 7/2002 | Murata | ................. G06F 16/683 |
| 2006/0073444 A1 | 4/2006 | Rines | |
| 2008/0057480 A1 | 3/2008 | Packard et al. | |
| 2009/0246749 A1 | 10/2009 | Thursfield et al. | |
| 2010/0068683 A1 | 3/2010 | Panec et al. | |
| 2011/0246888 A1 | 10/2011 | Drucker et al. | |
| 2014/0195222 A1 | 7/2014 | Peevers et al. | |

(Continued)

*Primary Examiner* — Thai Q Tran
*Assistant Examiner* — Jose M Mesa
(74) *Attorney, Agent, or Firm* — Reed Smith LLP; Matthew P. Frederick; Sidharth Kapoor

(57) ABSTRACT

System, apparatus and method for facilitating interactive reading can include an electronic device having a program or application thereon. In one embodiment, the application can recognize one or more cues, combined with an external data source, that result from reading a story aloud and/or performing one or more acts.

6 Claims, 7 Drawing Sheets

(56) References Cited

U.S. PATENT DOCUMENTS

| | | | |
|---|---|---|---|
| 2016/0154624 A1* | 6/2016 | Son | .......................... G06F 1/169 |
| | | | 704/235 |
| 2016/0358620 A1 | 12/2016 | Hammersley et al. | |
| 2018/0176409 A1* | 6/2018 | Smith | ................. H04N 1/00809 |
| 2019/0088158 A1* | 3/2019 | Remo | ................... G06F 3/0488 |

* cited by examiner

SYSTEM, APPARATUS AND METHOD FOR INTERACTIVE READING

CROSS-REFERENCE TO RELATED APPLICATIONS

The present is the United States national stage of International Application No. PCT/US2017/041836, filed Jul. 13, 2017, which application claims priority to U.S. Provisional Application No. 62/361,644, filed Jul. 13, 2016 and entitled "System and Method for Interactive Reading," and both of which are herein incorporated by reference in their entirety.

BACKGROUND

It is known to provide a device that responds to audio cues or reading aloud. For example, U.S. Publication No. 2006/0073444 discloses that the reader of a book use a coded indicia device to electronically scan indicia in a book to select an appropriate track on the device. Further, U.S. Publication No. 2009/0246749 discloses the use of a portable projector and light signals that include ultraviolet light.

BRIEF SUMMARY

The presently disclosed technology overcomes drawbacks in the above and other prior art, and provides additional advantages. For example, in one embodiment, the presently disclosed technology does not require that the book or other reading material have any electronic identifiers thereon or therein. In one embodiment, the presently disclosed technology employs a touch screen display, which can display and interact with content that has been activated by spoken words from one or more users.

In one embodiment, the present disclosure relates generally to a system and method that enables or facilitates interactive reading. In one particular embodiment, a computer application helps immerse a child into a book or story. A reader's or viewer's imagination can be stretched or expanded, thereby creating a unique experience and atmosphere, without detracting from the reading of the book or story. As a story is read aloud, the application can bring to life the scenes and atmosphere of the book through sounds, colors, motion and the like, all of which can be created from the application. These scenes (which can include sound effects, still graphics, animations, etc.) can be triggered and altered in response to external data sources obtained via the device, such as the movement of the reader, geographic location, the time of day, automatic calendar of seasonal events, holidays and festivities, and other variable external data sources. This experience can encourage a child to continue to read and give children a reason to read. The reader is also able to create their own scenes for their own publications.

In another embodiment, the present disclosure relates to a system that can be configured to provide an interactive reading experience. The system can include a microphone configured to convert sound into at least one electrical signal, a speaker configured to convert at least one electrical signal into sound, a display configured to convert at least one electrical signal into one or more visual representations, one or more processors operatively connected to the microphone, the speaker and the display, and one or more memories operatively coupled to the one or more processors and having computer readable instructions stored thereon which, when executed by at least one of the one or more processors, causes the one or more processors to receive a plurality of distinct audible cues through the microphone from an individual reading aloud from a predetermined script, and produce a plurality of responses through at least one of the speaker and display, each response of the plurality of responses being based on one of the plurality of audible cues.

In yet another embodiment, the present disclosures relates to a non-transitory computer-readable medium having computer-readable code stored thereon that, when executed by one or more computing devices, causes the one or more computing devices to receive, by at least one of the one or more computing devices, a first audible cue from an individual reading aloud from a predetermined script; produce, by at least one of the one or more computing devices, a first response through an electronic device based on the first audible cue; receive, by at least one of the one or more computing devices, a second audible cue from the individual reading aloud from a predetermined script, the second audible cue being different than the first audible cue; and produce, by at least one of the one or more computing devices, a second response through the electronic device based on the second audible cue, the second response being different than the first response.

In still a further embodiment, the present disclosures relates to method implemented by one or more computing devices for creating an interactive reading experience. The method can include receiving, by at least one of the one or more computing devices, one or more cues from an individual reading aloud from a predetermined script; and producing, by at least one of the one or more computing devices, a response based on each one of the one or more cues. A response associated with a first one of the one or more cues can be different than a response associated with a second one of the one or more cues.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings various illustrative embodiments. It should be understood, however, that the invention is not limited to the precise arrangements and instrumentalities shown. In the drawings.

DETAILED DESCRIPTION

Figure 1:
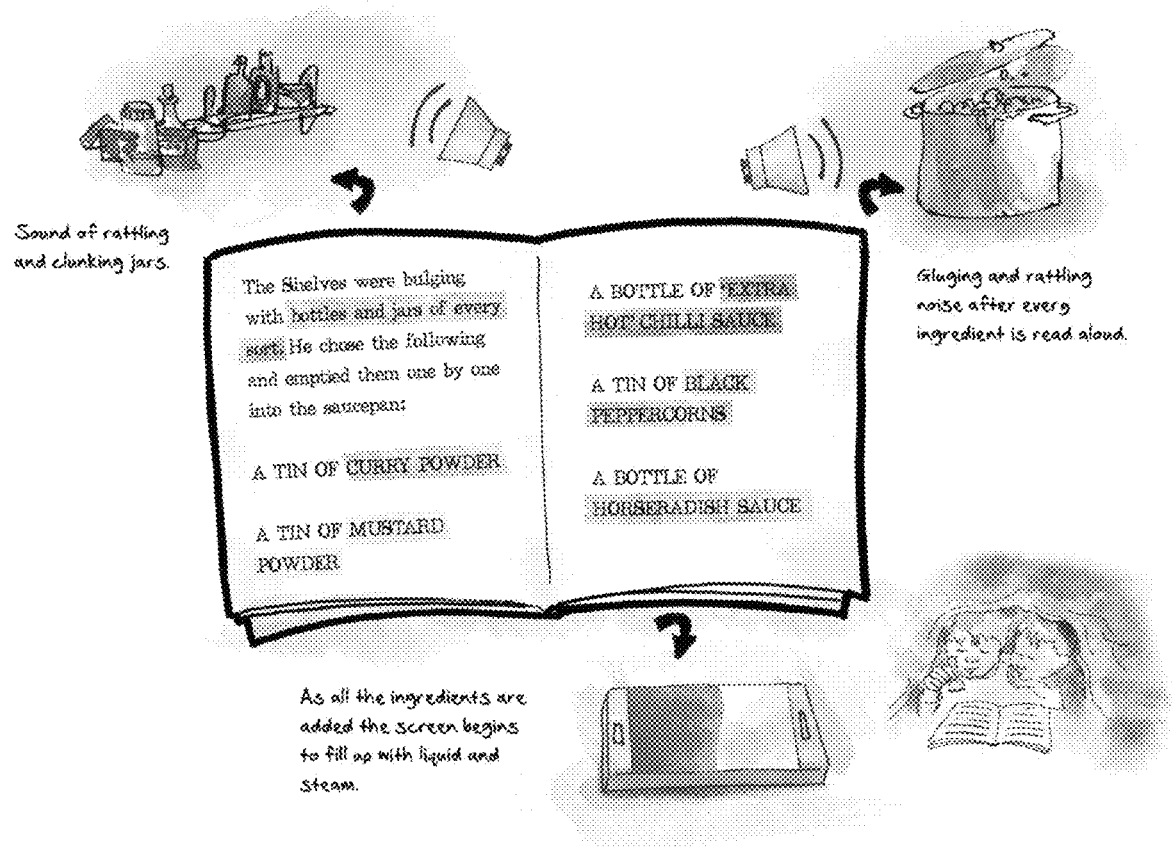
FIG. 1 shows a multitude of components and steps according to an embodiment of the present disclosure.

Certain terminology is used in the following description for convenience only and is not limiting. Certain words used herein designate directions in the drawings to which reference is made. Unless specifically set forth herein, the terms "a," "an" and "the" are not limited to one element, but instead should be read as meaning "at least one." The terminology includes the words noted above, derivatives thereof and words of similar import.

Referring to the drawings in detail, wherein like reference numerals indicate like elements throughout, FIGS. 1-7 illustrate a system and method designed to facilitate or encourage interactive reading. The system and method can include an electronic device, such as a hand-held mobile phone or a tablet or other computing device, having a program or application thereon or accessible thereto. The application and/or one or more portions of the electronic device can recognize one or more audible cues that result from reading a story aloud together with data-point(s) to then generate responses thereto. Stated differently, the application and/or one or more portions of the electronic device can employ voice recognition technology (e.g., a voice recognition chip, a microphone, a speaker, and a general purpose or application specific processor or integrated circuit) that can "listen" for audible cues, which, when spoken, trigger the application to automatically play or launch specific content through the electronic device. The specific content is designed to be relevant to the story and environment.

In operation of one embodiment, as a user or reader reads the story aloud, the application can identify and/or recognize one or more audible cues (e.g., sounds, words, phrases, sentences, inflections, etc.) and one or more sensed or received data-points or other external information, and produces one or more responses to same. The one or more responses can be to display an image, animation, video and/or game on a screen of the electronic device, and/or produce an audible noise or song through one or more speakers of the computer device, vibrate, flash and/or the like. The one or more responses can complement or enhance the story, and add or increase reader/viewer engagement. The one or more responses can be affected by the external data-source to be more personalized to the user's environment.

The story may be read from a book, a magazine, a publication, a newspaper, an electronic book, a website, a computer application, a game (e.g., a board game), a billboard or the like. The electronic device is not limited to being a hand-held mobile phone or a tablet. Instead, the electronic device may be a laptop computer, a desktop computer, a television, a wearable electronic device (e.g., a smart watch) or the like. While the application and/or one or more portions of the electronic device can recognize audible cues, alternatively or additionally the application and/or one or more portions of the electronic device can recognize visual cues (e.g., through a camera of the electronic device) and/or physical cues (e.g., shaking or twisting of the electronic device). The visual and/or physical cues may trigger a response from the application and/or electronic device.

Figure 2:
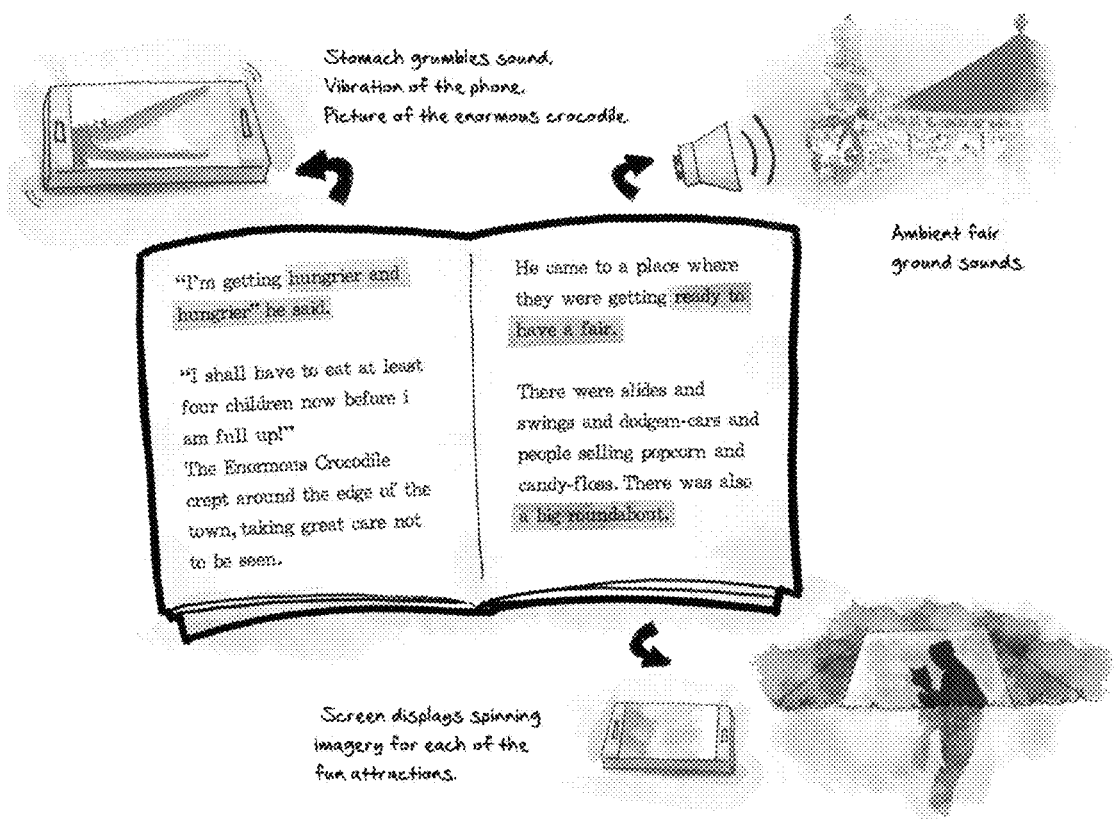
FIG. 2 shows a multitude of components and steps according to an embodiment of the present disclosure.

FIGS. 1 and 2 show embodiments of the present disclosure. For example, when the phrase "bottles and jars of every sort" is read aloud, the application and/or one or more portions of the electronic device can identify and/or sense that, and can cause the speaker of the electronic device to emit a sound of jars rattling and clanking. Alternatively or additionally, the application and/or one or more portions of the electronic device can cause the speaker to emit glugging and rattling noises after the application senses that ingredients are read aloud. As ingredients are read aloud, the application and/or one or more portions of the electronic device can cause the display of the computer electronic to appear to fill with liquid and display steam, show a picture of a crocodile and/or display spinning imagery. Of course, any of a plurality of responses (examples of which are described above) can be created or performed. In one embodiment, each response can last for only a few seconds, such that a plurality of responses can be played in series as the story is read.

In one embodiment, multiple sets of triggers or responses could be created for each story. Therefore, each time a story is read, different elements of the story may be addressed or brought to life by the application. For example, the first time a particular story is read, the application and/or one or more portions of the electronic device can generate three out of ten responses. When the same story is read for a second time, the application and/or one or more portions of the electronic device can remember (e.g., through memory) which three responses have already been generated and can generate additional or alternative responses.

In one embodiment, when the same story is read using a different data-point, e.g., a different geo-location, a different time of day, a different season, a different individual or reader, a different speed at which the story is read aloud, a different voice inflection by the reader, etc., the application can produce one or more variants of the response. For example, one or more scenes and/or sounds can be triggered and altered by external data sources obtained via the device, such as the movement of the reader, the reader's voice inflection, geographic location, the time of day, automatic calendar of seasonal events, holidays and festivities, and other variable external data sources.

One example of this embodiment would be a user reading about an adventure where a character is attempting escape on a horse. The device could respond with the sound of a horse galloping, but the pace and/or volume of the gallop sound could be affected by the movement of the device, i.e., fast device movement or fast shaking of the cell-phone results in a faster gallop. Another example of this embodiment including the playing of festive music in the background during the month of December via the device being fed data of the current date.

Figure 3:
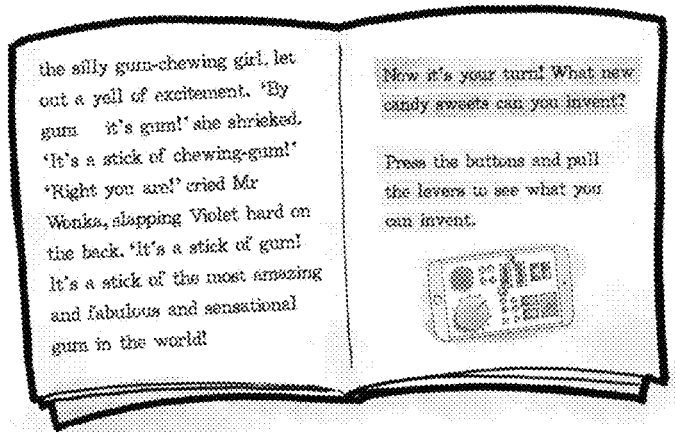
FIG. 3 shows a multitude of components and steps according to an embodiment of the present disclosure.
Figure 3:
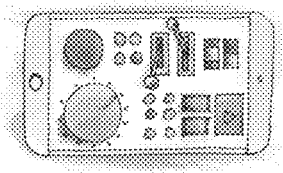
Figure 3:
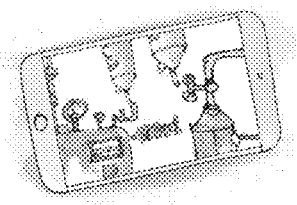
Figure 3:
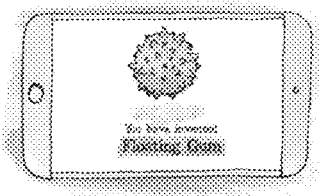

FIG. 3 shows another embodiment of the present disclosure, which directs the user or reader to complete or view certain activities on the electronic device. For example, when the phrase "now it's your turn" is read aloud, the application and/or one or more portions of the electronic device can cause the display of the electronic device to show a series of levers and buttons that may be manipulated or moved by a user touching specific portions of the display. Upon sensing the user touching one or more of the buttons, the application may cause the display to play an animated video and/or the speaker to emit sounds and/or songs. The video may be different depending upon which buttons or levers are selected by the user or reader.

Figure 4:
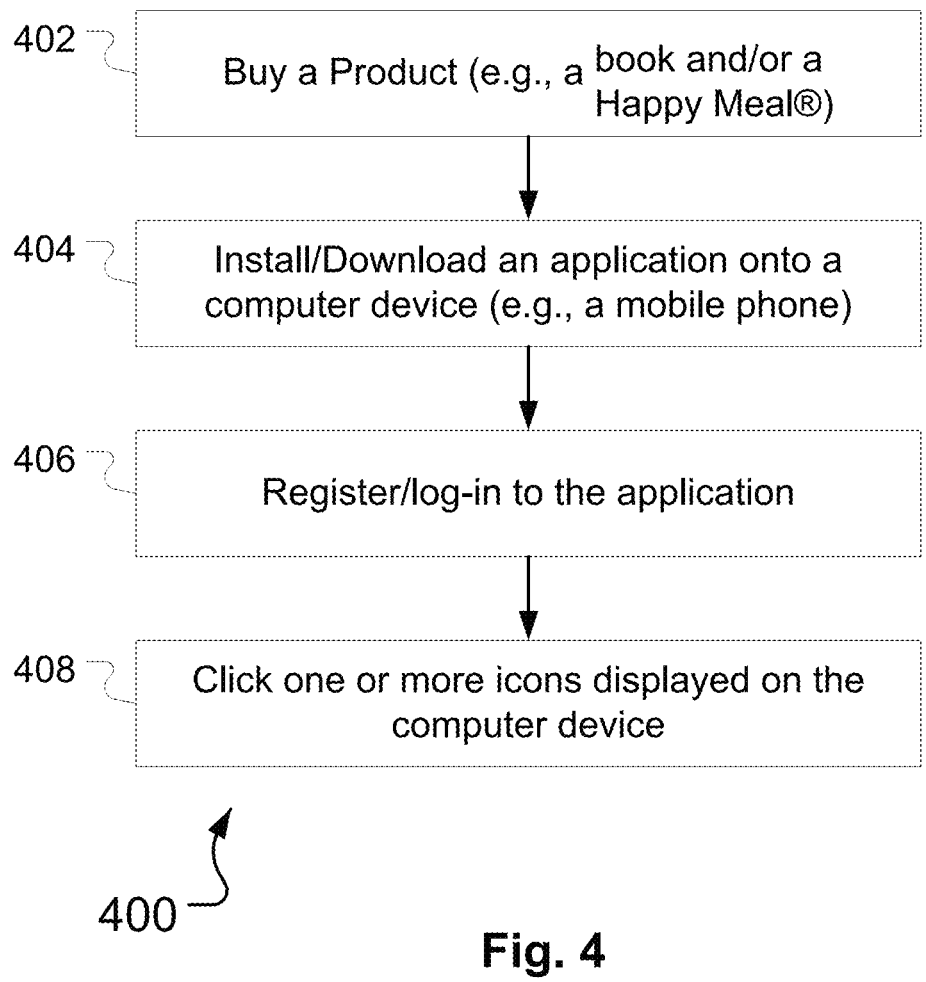
FIG. 4 shows several steps according to an embodiment of the present disclosure.

FIG. 4 shows an embodiment of a method, generally designated 400, of the present disclosure. The user or reader can purchase or obtain a product, such as a book and/or a Happy Meal® (Step 402). The product can include information or directions (e.g., on an instruction card, book or toy) for the user to install or download (e.g., from the Internet) an application onto an electronic device (Step 404). The user may or may not need to register or log-in to the application (Step 406). The user can begin the interactive reading exercise by selecting or clicking one or more icons on the display of the electronic device (Step 408). Alternatively, the application can automatically load. In either case, the application can be prepared to listen or sense cues from the user or reader.

Figure 5:
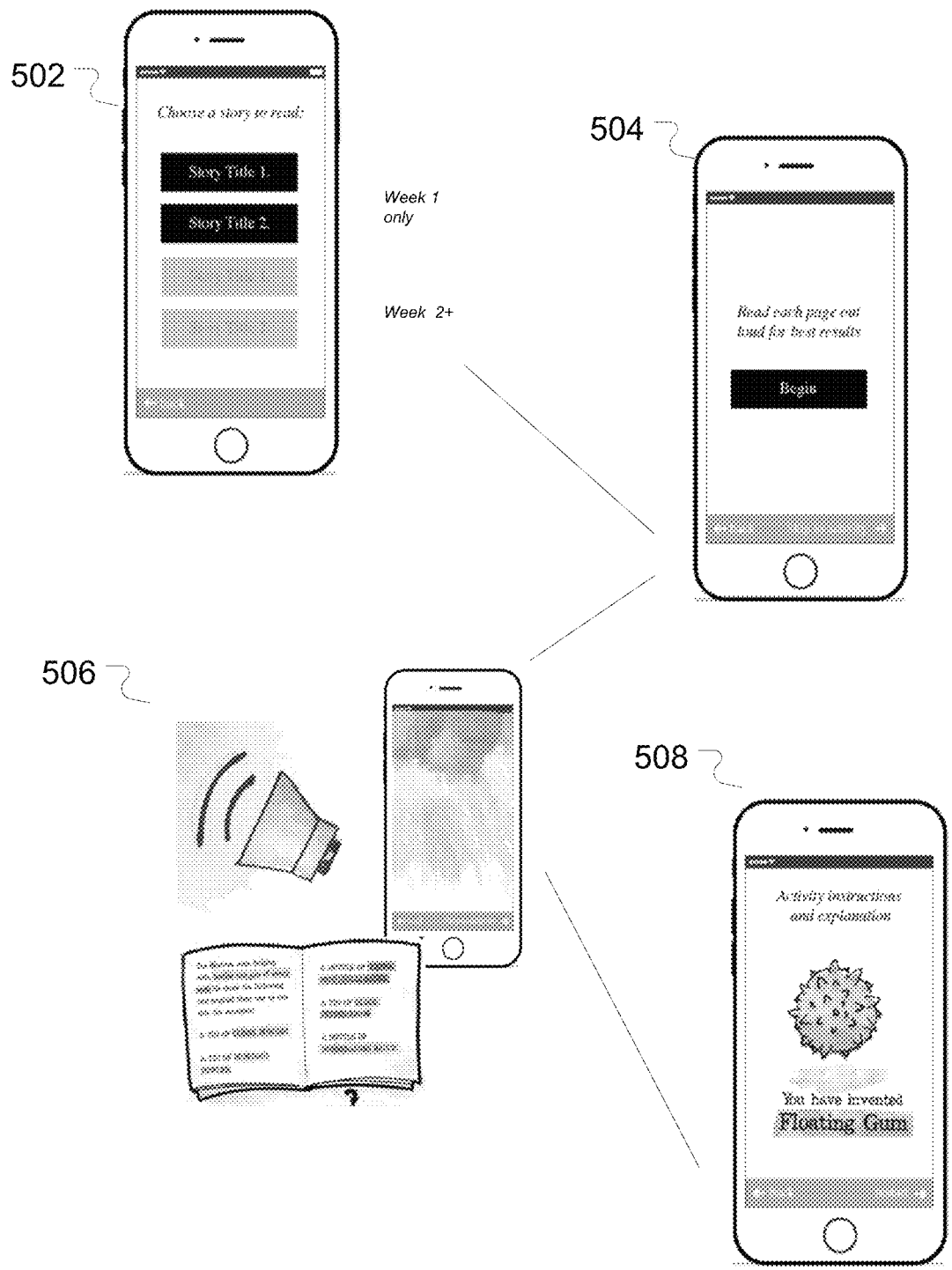
FIG. 5 shows a multitude of components and steps according to an embodiment of the present disclosure.

FIG. 5 shows an embodiment of method of the present disclosure once the application has been loaded or activated.

Initially, the application and/or one or more portions of the electronic device can cause the display of the electronic device to prompt a user or reader to select a story (Step 502). In one embodiment, the list of stories available or displayed can be restricted based on a predetermined time period (e.g., each week). For examples, two stories may be available during the first week, and two additional stories may be available each week thereafter. For each week, the application can load story specific assets or information.

Once a story is selected, the application and/or one or more portions of the electronic device can cause the display of the electronic device to provide instructions or tips to the user or reader (Step 504). An example of a tip is to read each word of the story out load, slowly and clearly for best results. The user can then select a "Begin" or "Start" button to cause the application to begin "listening" for the audible cues. Of course, users or readers can skip ahead or go back using appropriate controls on the display. The interactive reading method can continue as described above and shown in FIGS. 1-3.

Figure 6:
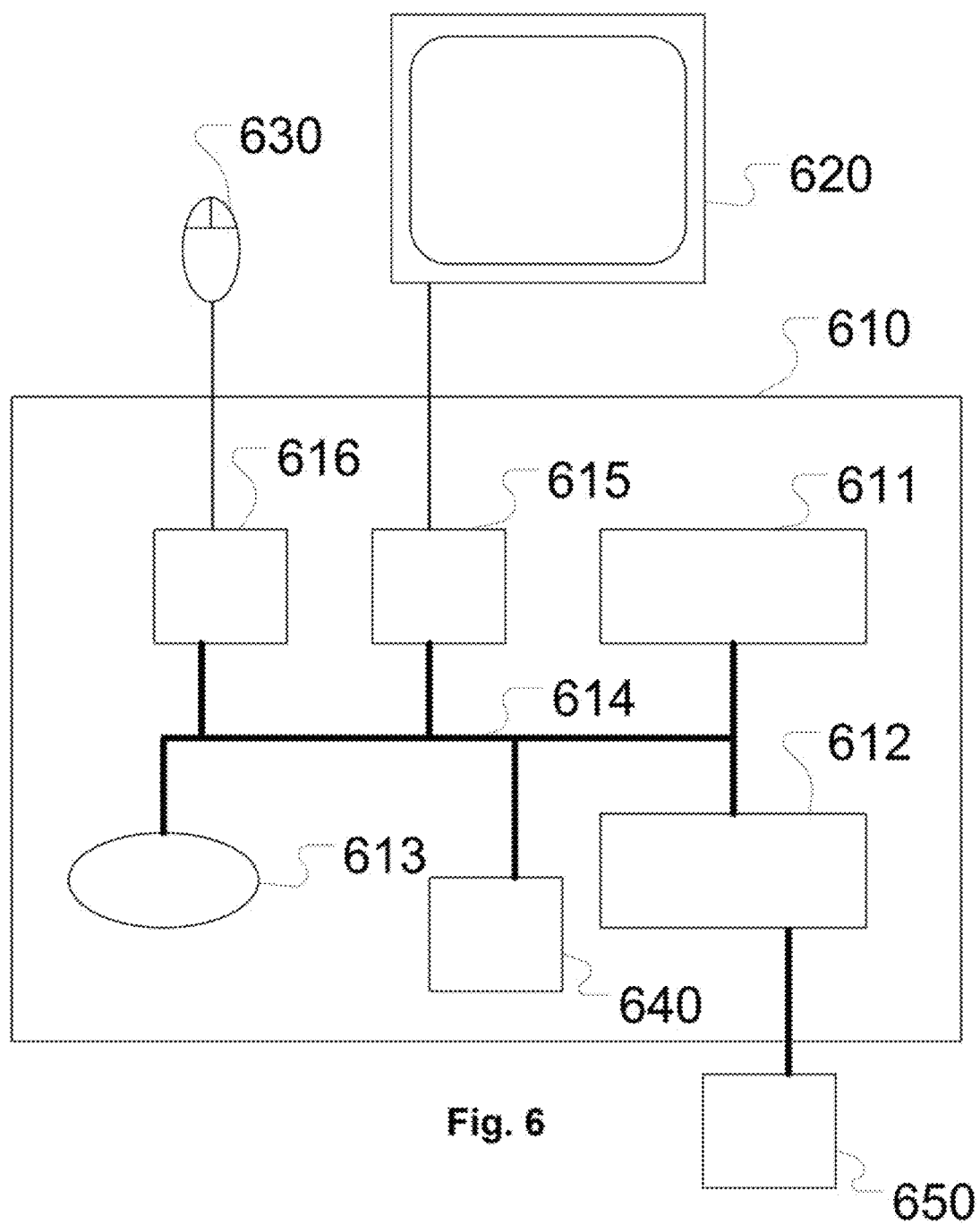
FIG. 6 shows an exemplary computing device useful for performing processes disclosed herein.

One or more of the above-described systems and/or methods may be implemented with or involve software, for example modules executed on one or more electronic devices 610 (see FIG. 6). Of course, modules described herein illustrate various functionalities and do not limit the structure or functionality of any embodiments. Rather, the functionality of various modules may be divided differently and performed by more or fewer modules according to various design considerations.

Each electronic device 610 can include one or more processing devices 611 designed to process instructions, for example computer readable instructions (i.e., code), stored in a non-transient manner on one or more storage devices 613. By processing instructions, the processing device(s) 611 may perform one or more of the steps and/or functions disclosed herein. Each processing device may be real or virtual. In a multi-processing system, multiple processing units may execute computer-executable instructions to increase processing power. The storage device(s) 613 may be any type of non-transitory storage device (e.g., an optical storage device, a magnetic storage device, a solid state storage device, etc. The storage device(s) 613 may be removable or non-removable, and includes magnetic disks, magnetic tapes or cassettes, CD-ROMs, CD-RWs, DVDs, or any other medium which can be used to store information. Alternatively, instructions may be stored in one or more remote storage devices, for example storage devices accessed over a network or the internet.

Each electronic device 610 additionally can have memory 612, one or more input controllers 616, one or more output controllers 615, and/or one or more communication connections 640. The memory 612 may be volatile memory (e.g., registers, cache, RAM, etc.), non-volatile memory (e.g., ROM, EEPROM, flash memory, etc.), or some combination thereof. In at least one embodiment, the memory 612 may store software implementing described techniques.

An interconnection mechanism 614, such as a bus, controller or network, may operatively couple components of the computing device 610, including the processor(s) 611, the memory 612, the storage device(s) 613, the input controller(s) 616, the output controller(s) 615, the communication connection(s) 640, and any other devices (e.g., network controllers, sound controllers, etc.). The output controller(s) 615 may be operatively coupled (e.g., via a wired or wireless connection) to one or more output devices 620 (e.g., a monitor, a television, a mobile device screen, a touch-display, a printer, a speaker, etc.) in such a fashion that the output controller(s) 615 can transform the display on the device (e.g., in response to modules executed). The input controller(s) 616 may be operatively coupled (e.g., via a wired or wireless connection) to an input device 630 (e.g., a mouse, a keyboard, a touch-pad, a scroll-ball, a touch-display, a pen, a game controller, a voice input device, a scanning device, a digital camera, etc.) in such a fashion that input can be received from a user.

The communication connection(s) 640 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

FIG. 6 illustrates the electronic device 610, the output device 620, and the input device 630 as separate devices for ease of identification only. However, the electronic device 610, the display device(s) 620, and/or the input device(s) 630 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). The electronic device 610 may be one or more servers, for example a farm of networked servers, a clustered server environment, or cloud service(s) running on remote computing devices. A data-source 650 can provide data, such as from one or more external sources, to the device 610. The data-source 650 can be external to the device 610 and can be provided by or coupled to a communication method, such as the Internet.

Figure 7:
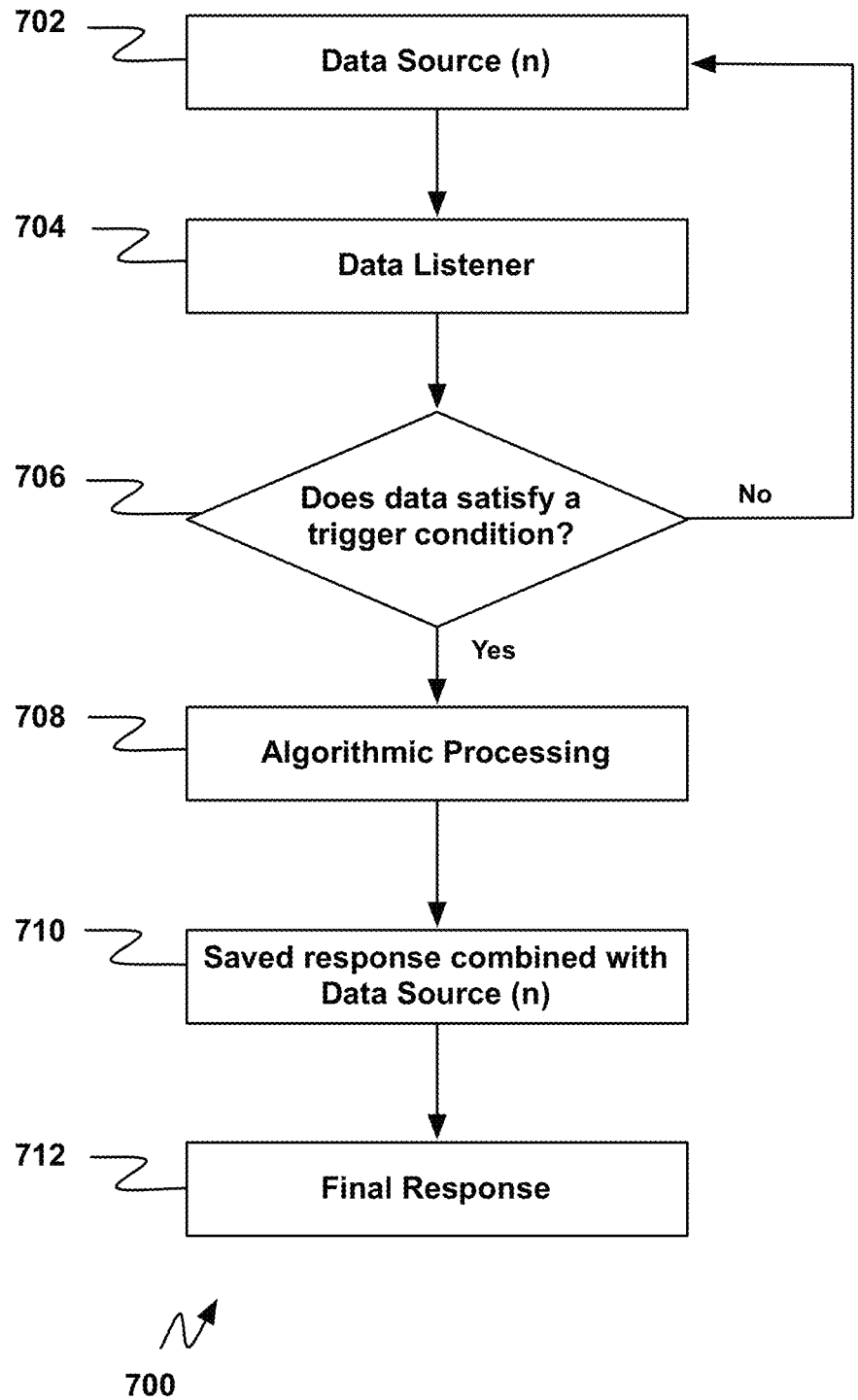
FIG. 7 shows several steps according to an embodiment of the present disclosure.

FIG. 7 shows an embodiment of a method, generally designated 700, of the present disclosure. A data source or multiple data sources (n) can be inputted into the device (Step 702). Alternatively, the device can receive data from one or more data sources. The device can continuously receive and/or listen to events or information from the data source(s) (Step 704). The device can compare the events or information to those stored on the device (Step 706). If there is a match between the stored event/information and the received data event/information, the device can then process or initiate a saved response against the current state of the data source to produce a new and unique response (Step 708 and Step 710). The device can then output a final response, which may be presented visually, audibly and/or physically (Step 712).

In contrast to prior art systems and methods, the system and method of the present disclosure does not require users to hold the phone in a certain position or orientation to activate augmented reality and/or markers within a book. The system and method of the present disclosure does not rely on pre-printed targets. The system and method of the present disclosure is also not limited to relying on a camera of the electronic device to sense cues, as the present disclosure may employ audio or motion sensors in addition to or in place of reliance solely on the camera, to sense cues from the user. The system and method of the present disclosure can effectively extend a user's interest in a story, because the application can produce different reactions to the same cues.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

We claim:

1. A method implemented by one or more computing devices for creating an interactive reading experience, the method comprising:
   a) receiving, by at least one of the one or more computing devices, one or more audible cues from an individual reading aloud from a predetermined script;
   b) receiving data other than the one or more audible cues, the data including information generated from at least one of a Global Positioning System (GPS), a motion sensor, a clock and a calendar;
   c) producing, by at least one of the one or more computing devices, a response based on each one of the one or more cues;
   d) comparing the received data to stored information;
   e) producing one or more responses based on the data in the event of a match between the data and the stored information; and
   f) altering the response through at least one speaker and a display of an electronic device based on external data sources, the external data sources correspond to one of a time of day, a type of search, a geo-location of the electronic device and degree of voice inflection of the individual reading aloud from a predetermined script, wherein a response associated with a first one of the one or more cues is different than a response associated with a second one of the one or more cues.

2. The method of claim 1, wherein at least one of the responses is an audible response manifested through a speaker.

3. The method of claim 1, wherein at least one of the responses is a visual response manifested through the display of the electronic device.

4. The method of claim 1, further comprising:
   downloading, by at least one of the one or more computing devices, an application to the electronic device prior to step a); and
   initiating, by at least one of the one or more computing devices, the application on the electronic device prior to step a).

5. The method of claim 1, further comprising:
   producing, by at least one of the one or more computing devices, a physical response based on each one of the one or more cues.

6. The method of claim 5, wherein the physical response includes at least one of vibration and shaking of the electronic device, and wherein the visual response includes at least one of flashing lights, an image on a display, and a video on the display.

* * * * *